United States Patent [19]

Callender et al.

[11] 4,280,050
[45] Jul. 21, 1981

[54] INFRARED VIEWER AND SPECTRAL RADIOMETER

[75] Inventors: Robert E. Callender, Woodbridge; Loren C. Doyle, Alexandria; William J. Lightel, Springfield, all of Va.

[73] Assignee: The United States of America as represented by the Secretary of the Army, Washington, D.C.

[21] Appl. No.: 130,957

[22] Filed: Mar. 17, 1980

[51] Int. Cl.³ .............................................. H01J 31/49
[52] U.S. Cl. .................................... 250/330; 250/334
[58] Field of Search ............... 250/330, 332, 334, 339, 250/342, 347, 352, 252; 350/1.5, 1.6, 311, 315

[56] References Cited

U.S. PATENT DOCUMENTS

| 3,202,759 | 8/1965 | Forgue | 250/334 |
| 3,442,572 | 5/1969 | Illsley et al. | 350/1.6 |
| 3,563,658 | 2/1971 | Dreyfus | 250/352 |
| 3,612,879 | 10/1971 | Ohman | 250/347 |
| 3,760,181 | 9/1973 | Daly et al. | 250/332 |
| 4,178,522 | 12/1979 | MacLennan et al. | 250/332 |

Primary Examiner—Alfred E. Smith
Assistant Examiner—Janice A. Howell
Attorney, Agent, or Firm—Nathan Edelberg; Robert P. Gibson; John E. Holford

[57] ABSTRACT

The invention provides a combined spectral radiometer and infrared viewer for use in the infrared and particularly the far infrared portion of the electromagnetic spectrum. A standard thermal viewer is modified by the addition of a temperature reference, a variable filter, a recording minicomputer and circuitry to intercouple these elements and synchronize their functions without impairing the use of the view in its normal make of operation.

10 Claims, 6 Drawing Figures

INFRARED VIEWER AND SPECTRAL RADIOMETER

The invention described herein may be manufactured, used, and licensed by the U.S. Government for government purposes without the payment of any royalties thereon.

BACKGROUND OF THE INVENTION

1. Field of the Invention

The invention relates to thermal viewers or infrared imaging devices, particularly a militarized system using common modules in the range of wavelengths from 2 to 14 microns.

2. Description of the Prior Art

Thermal imagers have evolved mainly along two lines. The first used vacuum tube technology, specifically vidicon and orthicon camera tubes with special retinas sensitive to infrared. The pyroelectric vidicon is an even more specialized version of this group. The second approach uses solid state devices usually in the form of diodes as individual pixel detectors. Since these diodes have been expensive to produce such viewers have slowly evolved from a model with a single diode over which the infrared image is scanned in two orthogonal directions to the more common single row of detectors centered on and normal to the optical axis of the viewer which requires scanning in one direction only. Two dimensional arrays are now emerging in devices that are called "staring detectors." The single row type usually employs a vibrating mirror to scan the image although there are designs with moving detectors and light emitting diodes that are electrically and mechanically intercoupled. The staring type detectors most advantageously employ the charge-coupled-device (CCD) sometimes referred to as "bucket brigade" circuits, which can also be used with row type detectors. As will be immediately evident to those skilled in the art, the present invention is applicable to all of the above described systems, but for simplicity it will be completely described only in combination with the more prevalent common module system with a single row of diodes, which is currently in production.

The common module system consists of a cubic central scanner module which is surrounded on its four windowed sides by add on modules. The top and bottom walls of the scanner module are used to mount a scanning mirror and its drive mechanism. In some models opposite sides of the mirror are used for synchronized scanning of infrared and visible images. A pair of opposed modules contain an objective lens for the infrared side of the mirror and an eyepiece for the visible image side. The remaining pair of add on modules contain the infrared detectors and electroluminescent devices with their accompanying coolers and intercoupling electronic circuitry. The add on modules can be further modularized as convenience dictates. Precisely defined interface flanges align the modules to a normalized central optical axis so that additional modules can be developed independently and inserted in the system. The light is usually collimated before it enters the central modules to prevent angular dispersion of the rays by the mirror. A more complete description of the common module system appears in U.S. Pat. No. 3,760,181 for a "Universal Viewer for Far Infrared" by Patrick J. Daly et al, issued Sept. 18, 1973.

In operation the above thermal viewer provides an image of varying brightness which is proportional to the temperature of the objects in the field of view. The temperatures are identified by the total radiation from each object over the bandwidth of the diodes and within certain transmission windows imposed by the earth's atmosphere. A number of these windows exist in the 2–14 micron range. The source of the radiation is usually a blackbody and will have the usual peak radiation frequency, gradual decay at lower frequencies and upper frequency cutoff. Other targets such as a gas flame or a gas present in the transmission path from a high temperature source will exhibit an emission or absorption spectrum characterized by narrow bands of radiation (or their absence) of different intensity. Such targets normally cannot be separated from the large amount of background radiation present on the basis of total radiation.

SUMMARY OF THE INVENTION

The present invention extends the utility of a thermal viewer such as the Universal Common Module Viewer mentioned above by adding additional element or modules which permit it to be used as a spectral radiometer. The normal viewing function is never completely eliminated and can be completely restored instantly. Maximum use is made of the normal viewer elements in the Radiometric mode. Absolute temperature references are used to support the radiometric function.

BRIEF DESCRIPTION OF THE DRAWINGS

The invention is best understood with reference to the attached drawings wherein.

DESCRIPTION OF THE PREFERRED EMBODIMENT

Figure 1:
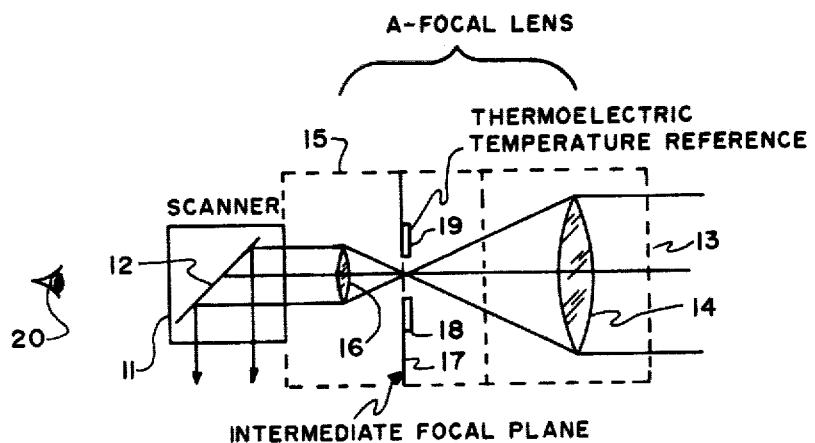
FIG. 1 shows a diagrammetric view of a central scanner module and an optical objective module with a thermal reference and collimation lens module inserted therebetween.

Referring more specifically to FIG. 1 there is shown a top view of portion of a thermal viewer currently being used in the electromagnetic energy wavelength band between 2 and 14 microns. The exact band to which the viewer is sensitive is a function of the type of detector from which it is made and the most convenient atmospheric window. One material is used extensively for the 8–14 $\mu$m window is HgCdTe which can be tailored to have a peak response at 12 $\mu$m and is sensitive to all the radiation in the window from 8–12 $\mu$m.

The center module 11 of the viewer contains a mirror 12 with a vibrating or rotating drive which rotates it about a center axis normal to the view shown. The light which forms the image is gathered by an objective lens module 13 with a lens 14 of germanium or other far infrared material or reflection elements such as a catadioptic reflection system. This is usually coupled to the center module through a collimating lens module which contains one or more lenses 16 similar to those already described. The collimated light leaving the center module is refocused to provide a secondary image on an array of detectors by a further module which will be discussed at FIG. 6.

Modules 13 and 15 form an afocal lens system with an intermediate focal plane at field stop 17. The vertical edges of the stop in module 15, according to the present invention, are defined by a pair of thermoelectrically heated strips or references 18 each having a horizontal width slightly more than half the width of the stop aperture and the inner edges of which in turn define the width of the primary image formed at this focal plane. Other arrangements are possible using more or less reference strips, but this balanced arrangement is preferred since it minimizes interference with the center image pixels which contain the most accurate information. In most cases the loss of image edges presents no problem but if the entire image must be occasionally restored there are several solutions. In one, the strips slide or fold out of view. A second means is to change the maximum angular vibration of the mirror. Still another method is to vary the magnifying power of the lens elements, i.e. by using a zoom lens. The strips can also be used by an observer to visually evaluate the scene.

Figure 2:
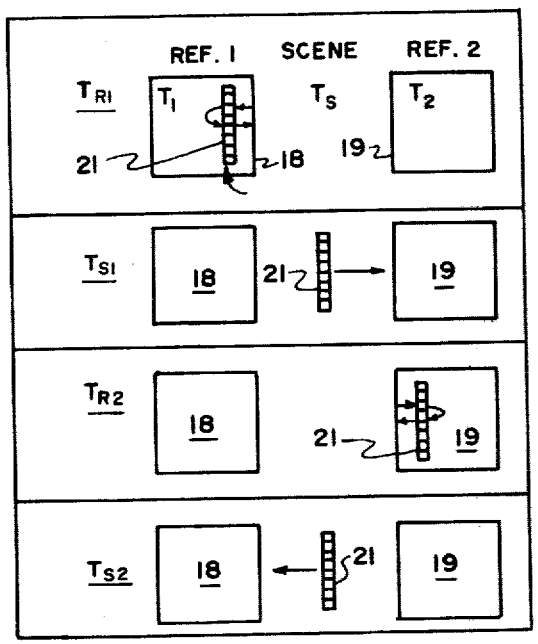
FIG. 2 shows a diagram of the apparent scan sequence of the detector relative to the images of the temperature references and scene being viewed.

FIG. 2 shows a typical scan sequence of the viewer. The sequence shown begins when the inner edge of the secondary image defined by reference 1 first strikes the detector array 21. Although the secondary image moves and the array remains fixed, FIG. 2 shows the detector from the vantage point of the secondary image as a matter of convenience. Moving to the right, the image causes an apparent left movement of the detector which reverses and returns to the same inner edge of the reference portion of the image after a time TR1. The image of the scene then traverses the detector to the left so that the detector appears to scan this image to the right in a time TS1. The process then occurs in reference 2 in a time TR2 and a reverse scan of the scene in a time TS2.

Figure 3:
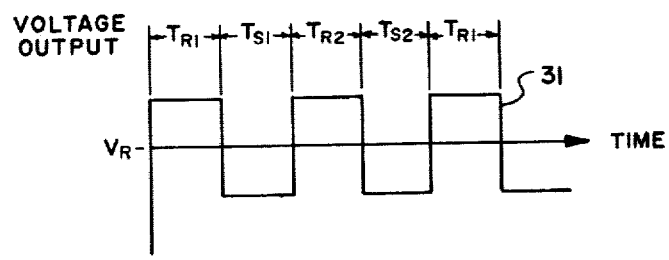
FIG. 3 shows the integrated output waveform of the detectors for a normal scene having a fairly uniform radiation density.

FIG. 3 shows the general shape of the output voltage waveform of the detectors. The waveform is a square wave having an average voltage level $V_R$, which is about half the maximum voltage variation when the periods TR1, TS1, TR2 and TS2 are equal. The voltage level $V_R$ is proportional to the irradience difference between the reference strips and the scene therebetween. By measuring the system gain (irradience to voltage) a calibration scale can be obtained which converts the voltage $V_R$ to apparent temperature. The calibration scale can be repeated across the subject atmospheric window to obtain an absolute temperature measurement as a function of temperature.

Figure 4:
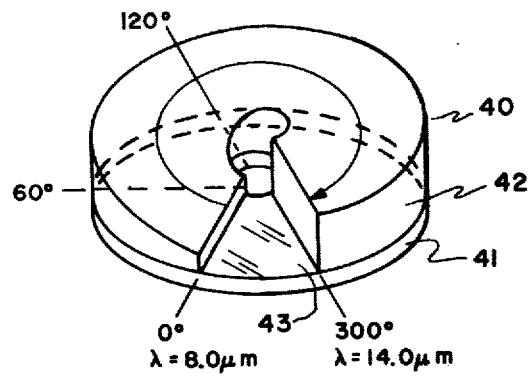
FIG. 4 shows an exaggerated model of a variable frequency filter element used in the present invention.
Figure 5:
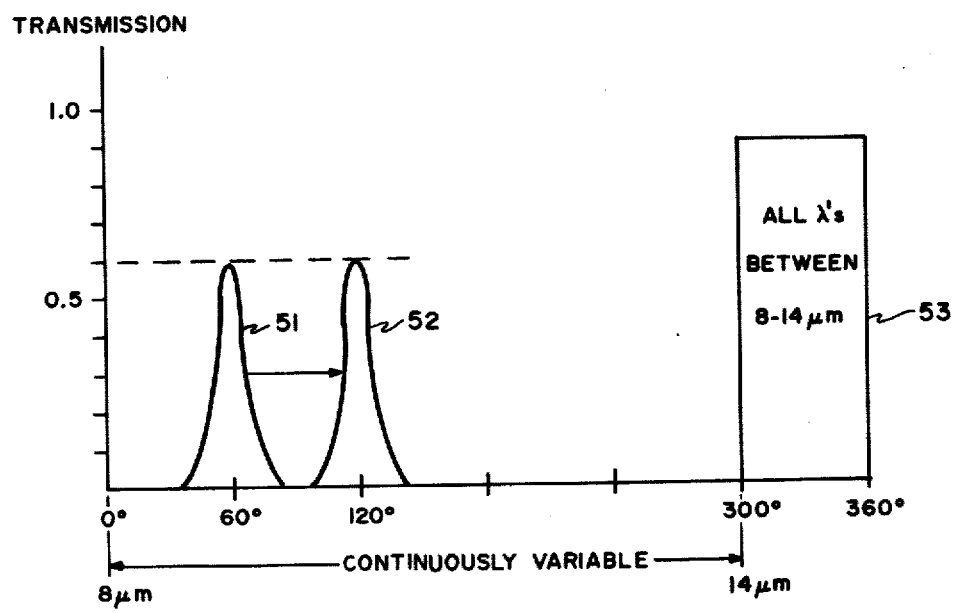
FIG. 5 shows a graph of the transmission characteristics of the filter of FIG. 4 at various settings thereof.

To separate the spectral radiations in the scene the variable filter 40 shown in FIG. 4 is employed. The filter consists of a thin circular backing plate 41 of material transparent to far infrared radiation such as germanium. A circumferentially tapering layer or layers are deposited on the backing plate to form an interference filter which selectively passes a narrow band (less than 10% of center frequency). There is no thickness variation in the radial direction. The pass bands presently preferred begin at 8 μm for the thinest part of the filter and vary linearly to 14 μm in 300° of the circumference for a variation of 0.02 μm/degree. The remaining area 43 of the plate is coated with an antireflection coating designed to pass all frequencies from 8 μm to 14 μm. The characteristics of the filter are shown graphically in FIG. 5. The window area 43 of the plate depicted by pass band 53 passes about 90% of the incident energy within its passband compared to about 60% for the filtering area. Suitable filters of this type are commercially available from the Optical Coating Laboratory, Inc., Technical Products Division, P.O. Box 1599, 2789 Griffen Ave., Santa Rosa, CA 95403.

Figure 6:
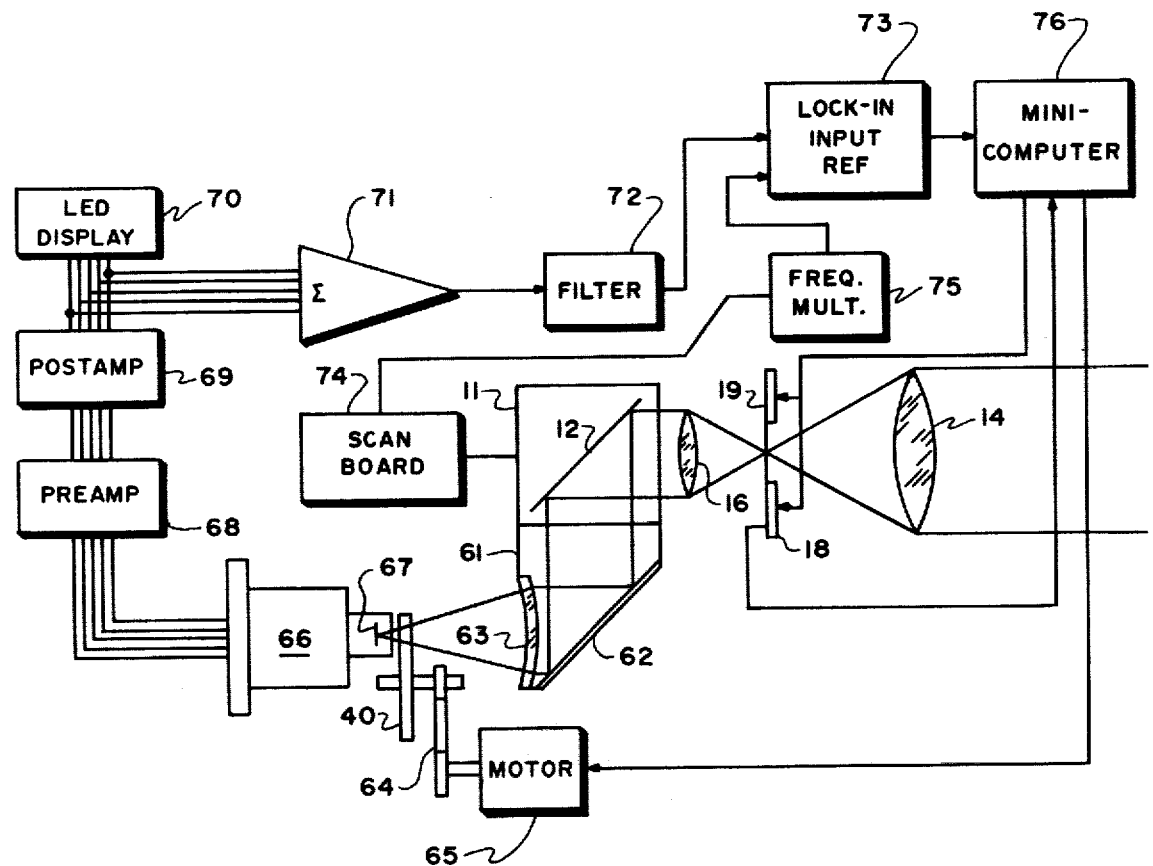
FIG. 6 shows a complete viewer system with the new elements or modules in their functional positions.

FIG. 6 shows the placement of the variable filter in the viewer. An optical module 61 is attached to the center module and includes a right angle reflection mirror 62 and a converging lens 63 to focus the infrared image on the detector array 67. To limit the instanteously active circumferential extent of the filter 40, it is placed as close as possible to the detector array. The filter 40 is placed as close to the detector array as possible to minimize that portion of the filter through which the optical bundle passes. This optimizes the systems wavelength discrimination by minimizing the total filter angle subtended. A radius of the filter is aligned parallel with the line through the centers of the detectors and intersecting the optical axis of the converging lens. The filter is mounted on an axle extending normally through the center of the backing plate and the latter is connected through a gear train 64 to a motor 65. The detectors are generally mounted in a dewar which forms part of a cooling system 66, and will be separated from the filter by a vacuum space and an infrared transparent dewar wall.

Each detector is provided with its own channel through the electrical portions of the viewer. The signals are fed first to a multichannel preamplifier and then to a postamplifier which drives an array of LEDs, or whatever is used for a display. The LED display may resemble the detector array and be viewed by reflection off the back side mirror 12.

For the purpose of providing an optimized function in the radiometer mode, the output of all "N" channels are summed by amplifier 71 (N being the number of detectors in the array). This increases the total vertical field of view by N times that of a single detector and improves the signal to noise ratio by a factor of $N^{\frac{1}{2}}$. It is preferred that amplifier 71 be a lock-in type amplifier. The summed signal from the detectors limited by bandpass filter 72 to reduce system noise before amplification. The lock-in reference frequency is derived from a position sensor which is part of the central scanner module. The output of the position sensor is a voltage which varys linearly with the angular position of the scan mirror. The resulting waveform is a multiple of the input signal and is used as the reference input for the lock-in amplifier. The output of the amplifier drives a minicomputer which analyzes and stores the signal data. The minicomputer also acts as a servo-amplifier to equalize the temperature of the reference strips 18 and 19 with the average temperature of the scene. For this purpose each strip has a temperature sensing element which feeds a reference voltage back to the computer while the computer controls the heat voltage or current supplied to the strips. If the temperature-vs-voltage characteristic of the strips are free of hysteresis, the computer may merely record the voltage applied to the strip which reduces the AC output of the detector array to zero. The choice may depend on the availablity of a suitable algorithm for the computer to translate the reference voltage into temperature. The computer also senses and controls the position of the filter wheel through a set of leads connected between the computer and motor 65. For this function a stepper type motor such as a model 23D-6209C Rapidsyn made by Computer Devices Corp., 11901 Burke St., Sante Fe Springs, CA 90670 is used which feeds back a position signal to the computer. The computer records the temperature of the strips as a function of the position of the filter wheel.

The quality of the image for direct viewing is compromised to a degree when the system is operating in the radiometric mode described above, but still may be acceptable in some high thermal contrast situations. To return the viewer to full operation it is only necessary to return the filter wheel to its 8–14 μm bandpass position.

We claim:

1. A combined infrared viewer means for producing a visible image of one or more distant objects using only the infrared radiation therefrom and spectral radiometer comprising:
   an objective lens means to project a primary image of said distant infrared emitting objects on a primary image plane;
   at least one electrically controlled reference temperature strip mounted in said primary focal plane adjacent said primary image;
   a second lens means interconnected with said first lens means to refocus said primary image and the emission from said strip on a secondary image plane as a combined secondary image;
   an infrared image detector in said image plane centered on and equally responsive to all portions of said secondary image; and
   a variable center-frequency narrow-bandwidth optical filter of infrared frequencies located between said second lens means and said image detector.

2. A viewer and radiometer according to claim 1 wherein:
   said viewer includes a scanning type imager; and
   two electrically controlled reference temperature strips are mounted in said primary focal plane on opposite sides of said primary image, the width of said strips being approximately half the spacing therebetween.

3. A viewer and radiometer according to claim 1 wherein:
   said filter comprises a rotatable circular disk having a portion transparent only to a narrow band of infrared frequencies the center frequency and bandwidth of which is substantially constant along any radial and varies circumferencially in a substantially linear relationship over a large portion of the circumference of said disk, the remaining portion of said disk being transparent to all of said frequencies; and
   said detector comprising a row of detectors radially mounted adjacent said disk.

4. A viewer and radiometer according to claim 1 wherein:
   a recording microcomputer having a first input is coupled to the output of said viewer to record the output signal therefrom.

5. A viewer and radiometer according to claim 4 wherein:
   said detector comprises a single row of diodes;
   a scanning mirror means is mounted between said first and second lens means to scan substantially all of said secondary image linearly over said detector;
   a scanning circuit means is connected to said mirror means to drive same; and
   said microcomputer has a second input coupled to said circuit means and includes circuit means therein to correlate said first and second inputs and provide maximum signal-to-noise from said first input.

6. A viewer and radiometer according to claim 4 wherein:
   said reference strip is electrically connected to said computer whereby said temperature may be varied linearly and cyclically in synchronism with a plurality of scans of said mirror.

7. A viewer and radiometer according to claim 4 wherein:
   said filter is coupled for rotation about its axis of symmetry to an electric motor; and
   said motor is electrically coupled to said computer for stepped rotation between temperature cycles of said strip.

8. A viewer and radiometer according to claim 7 wherein:
   said computer includes means to record the temperature of said strip which coincides with minimum AC output from said viewer for each rotation step of said filter.

9. A method of analyzing the image of a scene produced by a scanning infrared viewer comprising the steps of:
   cyclically heating the edge of a field stop overlapping the edge of said image through a range of temperatures including the average temperature of said scene, over a period of a number of scans;
   filtering said image with a bandpass filter having a center frequency that remains constant over each cycle of said heating and changes for sequential cycles thereof; and
   recording the temperature in each cycle which results in a minimum AC output from the infrared detector of said viewer.

10. The method according to claim 9 wherein:
    the center frequency of said filter is varied over a frequency range including wavelengths between 8 and 14 micrometers.

* * * * *